Jan. 9, 1962     E. F. McCLURE     3,015,854
METHOD OF SHAPING FOAMED RUBBER LATEX
Filed April 10, 1956
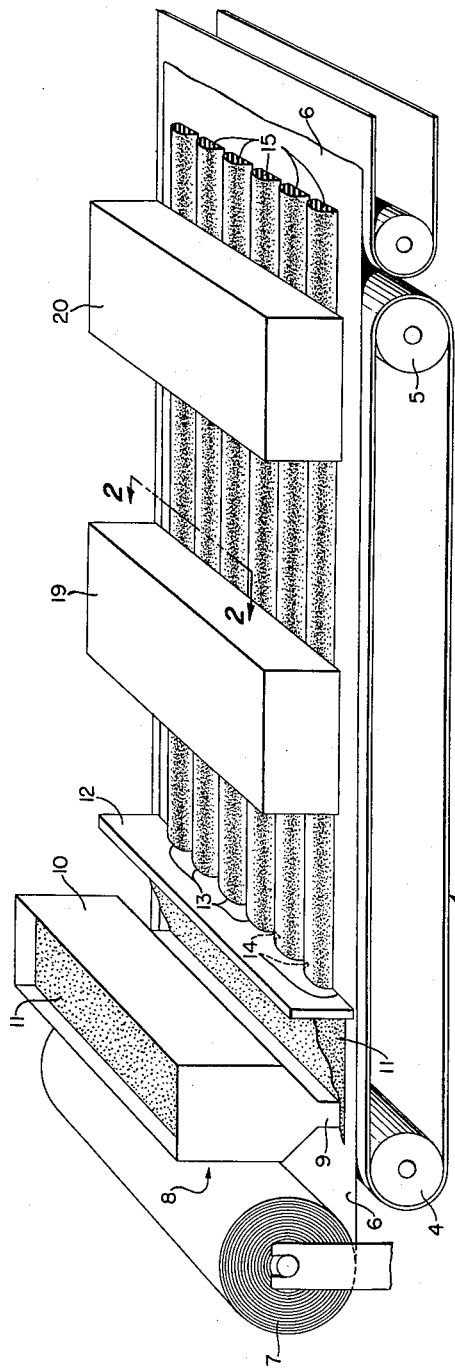
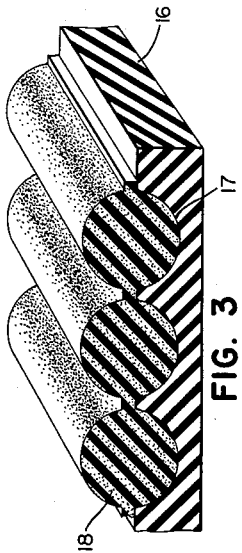
INVENTOR.
EARL FRANCIS McCLURE
BY
*R. L. Miller*
ATTORNEY

3,015,854
METHOD OF SHAPING FOAMED RUBBER LATEX
Earl F. McClure, Cuyahoga Falls, Ohio, assignor, by mesne assignments, to The Goodyear Tire & Rubber Company, a corporation of Ohio
Filed Apr. 10, 1956, Ser. No. 577,310
1 Claim. (Cl. 18—53)

This invention relates to improvements in shaping foam rubber latex sponge.

Most foam rubber latex sponge is shaped by pouring ungelled foamed latex into molds having the configuration desired for the finished article. Continuous slabs of sponge are formed by passing ungelled foamed latex under a doctor blade which levels the mass of foam in a horizontal plane. The molded and leveled mass of foam are then each gelled and vulcanized into the finished sponge. If it is desired to continuously form a configured slab of sponge, it becomes necessary to first gel or dry the level slab of foamed latex and then compress the gelled or dried slab into the desired configuration. Impressions upon the gelled foam cause the formation of dense areas of crushed latex to which it is difficult to stitch fabric and also represents a waste of rubber in these crushed areas.

It has now been discovered that configured sponge having a uniform density may be continuously made by passing stiffened but ungelled foamed latex under a shaping means which forms the ungelled foamed latex into the configuration desired, and due to the stiff character of the foam retains the shape imparted thereto until the foam is gelled.

The invention is illustrated in the accompanying drawing in which:

FIG. 1 is a diagrammatic view of apparatus for producing configured sponge; and

FIG. 2 is an enlarged view of a form of configured sponge taken on the line 2—2 of FIG. 1; and FIGURE 3 is an enlarged view in cross section of another form of configured sponge made in a continuous manner.

Referring to FIG. 1 of the drawing, an endless belt 3 moves clockwise about the drive means 4 and 5. On the upper surface of the drive belt 3 is carried a continuous sheet of fabric 6 fed from a source 7 to a loading station 8 and under the discharge opening 9 of the storage means 10 containing ungelled foamed rubber latex 11. The foamed latex may also be deposited onto the fabric from a flexible hose arranged to move back and forth in front of the doctor blade at a rate sufficient to maintain a rolling bank of foam across the full width of the doctor blade. The foamed rubber latex is then shaped by means of the doctor blade 12 provided with arcuately cut-out sections 13. As the stiff foam passes through these arcuately shaped openings 13, the foam is arranged into continuous lengths of ungelled foamed rubber latex having the shape imparted by the arcuate openings 13. The doctor blade 12 may be set so that the lower edge 14 thereof is immediately adjacent the upper surface of the fabric 6, thereby forming the ungelled foamed rubber latex into separate sections 15, as shown.

Thus, by means of the present invention its becomes possible to shape the ungelled foamed rubber latex in such a manner that the foamed latex is not compressed. The foamed latex may also be shaped by slowly undulating the doctor blade 12 transversely of the longitudinal axis of the continuous belt 3 to form undulated sections in place of the straight sections 15.

When a configuration of the type shown in FIG. 3 is desired, a belt having a plurality of parallel trough sections 17 is used in place of the belt 3 onto which is spread the stiffened latex foam 11, which foam is then shaped on the upper side by means of the doctor blade 12. The lower edge of the doctor blade is spaced from the upper surface of the belt 16 to form the connecting webs 18. The thus shaped foam is then processed as described above. A fabric may be used to line the upper belt surface 16, which fabric then becomes a part of the foam. A series of shaping means may also be used in combination with each other to configure the foamed latex as desired. For example, one forming means could first shape the foamed latex in a longitudinal direction and then a second shaping means could oscillate transversely of the longitudinal direction to break up the pattern formed by the first shaping means.

Other modifications may be used in forming other configurations in a manner similar to those described.

After the ungelled foamed rubber latex has been shaped into the desired configuration, the foamed latex is caused to be gelled as by passing the shaped foamed latex under the gelling chamber 19 and then the gelled foamed latex is caused to be cured by passing the gelled latex under the curing chamber 20, after which the cured latex is washed, dried and otherwise treated in accordance with conventional practice.

The latex used in making the foamed rubber latex is compounded in accordance with the following general formulation:

| | Parts |
|---|---|
| Rubber latex | 100 |
| Frothing agent | 1 to 10 |
| Vulcanizing agent | 1.5 to 5 |
| Vulcanization accelerator | 1.5 to 4 |
| Gelation sensitizing agent | .5 to 2.5 |
| Antioxidant | .5 to 3.5 |
| Stiffening agent for foamed latex | .5 to 50 |
| Zinc oxide | 3 to 10 |
| Gelation agent | 2.5 to 10 |

In making the shaped ungelled foamed rubber latex of this invention the compounding of the rubber latex depends upon many different factors. However the essential ingredient in compounding the rubber latex is the thickening agent that is used to permit the formation of a foamed rubber latex having the consistency, for example, of frothed white of eggs and at least a stiffness sufficient to resist deformation under its own weight when shaped with a flattened side as shown in FIG. 2. The amount and type of stiffening agent used is selected and adjusted to obtain a foamed rubber latex having a resistance to deformation in the ungelled state that will permit the froth to be readily shaped continuously into a desired configuration and maintain that shape during subsequent processing of the foamed latex.

In compounding the rubber latex it becomes important to preserve the foamability of the compounded latex so that the compounded latex may be readily foamed in conventional foaming equipment used in converting rubber latex into a froth by whipping or beating air into the latex, causing it to expand in volume and develop a fine cellular structure.

In addition to being able to foam the compounded rubber latex in a conventional manner, it is also necessary to produce a foam containing a stiffening agent which may be readily shaped to the desired configuration by passing the stiffened ungelled foam under a configured doctor blade in a continuous manner. It is desirable that the foam readily take the shape imparted to it as it passes under the configured doctor blade and then maintain the shape imparted to it after it has passed beyond the doctor blade. It is important that the foamed latex not catch, deposit nor build up on to the shaping surfaces of the doctor blade and thus distort the shaping outline of the configured doctor blade. A doctor blade thus distored tends to produce a configured sponge having a roughened surface in contrast to a smooth and even surface of foamed latex and, more undesirable, a configured sponge having unwanted dimensions.

It is observed that when one type of primary stiffening agent is added to the rubber latex prior to frothing, there is a tendency to stiffen the latex to a degree where it becomes somewhat difficult to form the desired foam and thus interfere with the rapid production of foam necessary in a continuous operation run at a relatively high rate of speed. On the other hand if another type of primary stiffening agent is used that does not increase the stiffness of the latex to a degree that tends to interfere with its conversion into a desired foam, the resulting foam is sensitive to distortion and consequently has a tendency to lose the shape imparted to it. The important feature in adjusting the stiffness of the foam to readily accept configuration is the ability of the configured foam to retain the shape imparted to it throughout its subsequent treatment in becoming gelled, vulcanized and washed. The most critical period of the life of the configured ungelled foam is from the moment it has been configured until it has been gelled. During this interval of its life the shaped ungelled foam is most susceptible to distortion and it is this distortion that must be guarded against by the proper compounding of the rubber latex.

It has been observed that the preferred manner of compounding the latex is to add a primary thickener to the latex prior to foaming, which primary thickener does not interfere with the foamability of the latex, followed by the addition of a secondary thickener after frothing which further thickens or stiffens the froth to the proper degree of resistance to deformation.

Primary thickeners that may be used in this invention are those compositions known as water soluble proteins having a molecular weight of at least 34,000, being colloidal in character and of a complex combination of relatively simple amino acids found in both animal and vegetable organisms. Specific proteins being soybean protein, egg albumin, hemoglobin, casein and gelatin. Other primary thickening agents that may be used include the water-soluble vegetable mucilages, such as sodium alginate, ammonium alginate, locust bean gum and gum tragacanth, also bean albumin. These stiffening agents may be used singly or in combination with each other. These primary stiffening agents, particularly the protein of soybean, may be used in an amount of .01 part to 5 parts per 100 parts of rubber, depending, of course, upon the other compounding ingredients used.

These stiffening agents permit the latex to be foamed into a partially stiffened froth.

The partially stiffened froth is then further stiffened by the addition of a secondary stiffening agent which may be readily mixed into the partially stiffened foam in any desirable manner in order to uniformly disperse the agent throughout the foam. It has been observed that the alkali polyacrylates, such sodium polyacrylate and ammonium polyacrylate, function as a secondary stiffening agent in combination with the primary stiffening agents disclosed above to increase the stiffness of the partially stiffened foam to a degree whereby the foam may be shaped into a desired configuration and retain the shape imparted to it without becoming distorted under its own weight or during subsequent treatment in the gelling chamber. Other stiffening agents that may be used include the carboxy-alkyl celluloses, such as carboxy-methyl cellulose and polyvinyl alcohol which may be used either alone or in combination with the water-soluble protein stiffener. These secondary stiffeners may be used in amounts from about .05 part to about 5 parts per 100 parts of rubber, depending again upon the specific formulation used in compounding the rubber.

In addition to this system of primary and secondary stiffening agents, it has also been observed that under accelerated conditions of production where the shaped foamed latex is gelled under heat conditions up to 200° F., the stiffened foam has a tendency to become distorted slightly when heated to this temperature. To overcome this difficulty under these particular conditions, it has been observed that a heat-sensitive stiffening agent may be added at the time the secondary stiffening agent is added to the partially stiffened foam. A particular heat-sensitive stiffening agent is polyvinyl methyl ether which may be used in amounts from .05 to 2 parts per 100 parts of rubber, and preferably in proporitons of from .1 to .5 part. Other heat-sensitive stiffening agents that may be used in addition to polyvinyl methyl ether include the half amide of the reaciton product of methyl vinyl ether and an anhydride such as maleic anhydride or ammonium maleamate, as well as the cellulose ethers such as methyl cellulose.

The following examples disclose a specific embodiment of this invention. All parts are by weight unless otherwise indicated.

*Example I*

The following compounding ingredients were added to 161 parts of a 62% solids latex of a rubbery copolymer resulting from the aqueous emulsion polymerization at 50° F. in the presence of .1 part of cumene hydroperoxide as a catalyst of a mixture of 70 parts of butadiene-1,3 and 30 parts of styrene in the order listed and in the amounts indicated as parts by dry weight and added as an aqueous dispersion containing percent solids as indicated:

| | Parts |
|---|---|
| (1) Rubbery copolymer of butadiene-1,3/styrene 70/30 (60% solids) | 100 |
| (2) Potassium soap of castor oil (35% solids) | .8 |
| (3) Zinc diethyldithiocarbamate (50% solids) | .8 |
| (4) Zinc mercaptobenzothiazole (40% solids) | 2.0 |
| (5) Sulfur (60% solids) | 2.5 |
| (6) Commercial mixture of alkylated phenols (66% solids) | 1.5 |
| (7) Soybean protein (15% solids in water containing 1.5% $NH_4OH$) | .2 |

The foregoing ingredients were blended in a suitable mixing vessel and then diluted with water to a total solids content of 61%, the resulting diluted blend was then foamed to a specific gravity of .1 by means of a conventional frothing mechanism wherein air was whipped into the compounded rubber latex at room temperature.

The following ingredients were then distributed evenly throughout the foamed latex:

| | Parts |
|---|---|
| (1) Zinc oxide (50% solids) | 4 |
| (2) Diphenyl guanidine (15% solids) | .75 |
| (3) Potassium silico fluoride (30% solids) | 4.5 |
| (4) Sodium polyacrylate (12.5% solids) | .5 |

After the above ingredients were added to the foamed latex and evenly dispersed the foam was then deposited onto a closely woven cotton fabric as shown by 6 in FIG. 1 of the drawing throughout its 36″ width and for 5′ of its length and then formed into arcuate rib sections ¼″ thick and 1″ wide, each rib being spaced ⅛″ from the other at its base. These configured rib sections were then gelled at 180° F. for 3 minutes and then vulcanized at 250° F. for 10 minutes and then washed in water and dried all in a conventional manner. The resulting ribs were of a smooth, even contour having substantially the same dimensional outline imparted to them in their ungelled state.

*Example II*

Example I was repeated with the exception that 100 parts of natural rubber latex containing 60% solids was used in place of the rubbery copolymer and .3 part of sodium oleate containing 18% solids and .75 part of sodium rosinate containing 19% solids was used in place of the .8 part of the sodium soap of castor oil.

The completely compounded and stiffened foam was configured in the same manner described for Example I and found to faithfully retain the shape imparted to it by the doctor blade during gelation in the gelling chamber 19 shown in FIG. 1. The resulting vulcanized, washed and dried configured sponge had a smooth even texture.

*Example III*

The ingredients of Example I were used here with the exception that the soybean protein was omitted and the sodium polyacrylate was replaced with 1.0 part of a 4% solids dispersion of the sodium salt of carboxy methyl cellulose. The foamed rubber latex stiffened with the sodium salt of carboxy methyl cellulose was shaped in the manner disclosed in Example I and found to retain the shape imparted to the stiffened foam. The resulting vulcanized foam had a smooth surface and an even contour, as well as the dimensional outline imparted to it in its ungelled state.

The resulting shaped foamed rubber latex in each of these examples was assembled into a transportation seating cushion and found to perform in a satisfactory manner with regard to supporting an object as well as its ability to retain its shape.

*Example IV*

This example is similar to Example I but using a combination of primary, secondary and heat-sensitive stiffening agents. The following ingredients were blended together in the order listed:

| | Parts |
|---|---|
| (1) Rubbery copolymer of butadiene-1,3 and styrene 70/30 respectively (60% solids) | 100 |
| (2) Frothing agent and stabilizer for the latex, potassium linoleate (20% solids) | .6 |
| (3) Additional type of latex stabilizer, potassium soap of castor oil (35% solids) | 1.0 |
| (4) Vulcanization accelerator, zinc diethyldithiocarbamate (40% solids) | .8 |
| (5) Zinc mercaptobenzothiazole (40% solids) | 2.0 |
| (6) Vulcanization agent, sulfur (60% solids) | 2.4 |
| (7) Antioxidant commercial mixture of alkylated phenols (66% solids) | 1.5 |
| (8) Paraffin wax (55% solids) | 3.3 |
| (9) Protein of soybean (15% solids) | .225 |
| (10) Talc added as dry powder | 20 |

The foregoing ingredients were blended in a suitable mixing vessel and then diluted with water to a total solids content of 61%. The resulting diluted blend was then foamed to a specific gravity of .1 by means of a conventional frothing mechanism wherein air was whipped into the compounded rubber latex at room temperature.

The following ingredients were then distributed evenly throughout the foamed latex:

| | Parts |
|---|---|
| Zinc oxide (40% solids) | 4.0 |
| Diphenyl guanidine (15% solids) | .9 |
| Potassium silico fluoride (30% solids) | 4.5 |
| Polyvinyl methyl ether (24% solids) | .48 |
| Ammonium polyacrylate (25% solids) | .25 |

After the above ingredients were added to the foamed latex and evenly dispersed, the foam was then deposited onto a closely woven cotton fabric and shaped in the manner described for Example I. The configured foam faithfully retained the shape imparted to it by the doctor blade during its travel from the doctor blade to the gelling chamber 16 shown in FIG. 1, except for normal shrinkage, and from the gelling chamber to the curing chamber 17 shown in FIG. 1 where it was vulcanized at 250° F. for 10 minutes. The resulting vulcanized configured foamed rubber latex was washed with water and dried with air in a conventional manner all without any loss of the shape originally imparted to it in the ungelled state.

The present invention is particularly adapted to the continuous shaping of ungelled, stiffened, foamed rubber latex of either natural rubber latex or of synthetic rubber latex. These latices may be used either alone or in admixture with each other. In the preparation of the synthetic rubber latex, in accordance with well-known methods, polymerizable monomeric compounds are emulsified in an aqueous medium by means of an emulsifying agent and polymerization is made to take place generally at elevated temperatures in the presence of a catalyst and other regulating materials. Examples of such polymerizable monomeric compounds include the various diene hydrocarbons such as butadiene-1,3, methyl-2-butadiene-1,3 (isoprene) 2,3-dimethyl butadiene-1,3, pentadiene-1,3 (piperylene), as well as the chlorinated butadienes, such as 2-chlorobutadiene-1,3 and the like. The polymerizable material, as is well known, may comprise a mixture of a diene hydrocarbon, such as butadiene-1,3, and another polymerizable compound which is capable of forming a rubbery copolymer with the diene hydrocarbon and especially the copolymerizable monomers containing a vinyl ($CH_2=CH-$) group. Typical monomers containing this group copolymerizable with diene hydrocarbons are the aryl olefins, including styrene, vinyl toluene, alpha methyl styrene, and vinyl napthalene. The alpha methylene carboxylic acids and their esters, nitriles and amides may be used, including such monomers as acrylic acid, methyl acrylate, methyl methacrylate acrylonitrile, methacrylonitrile, and methacrylamide. Methyl vinyl ether, methyl vinyl ketone, and vinylidene chloride may also be used.

Well-known commercial types of synthetic rubber latices are the aqueous emulsion polymerizates resulting from the polymerizaiton of, for example, a mixture of 75 parts of butadiene-1,3 and 25 parts of styrene, known as GRS latex, the aqueous emulsion polymerizates resulting from the polymerization of a mixture, for example, comprising 70 parts of butadiene-1,3 and 30 parts of acrylonitrile to form the rubbery copolymer known as GR–N latex and the aqueous emulsion polymerizate of 2-chlorobutadiene-1,3 known as neoprene latex or GR–M. Thus the term "rubber latex" is used in a generic sense to include the natural rubbers and the synthetic rubbers, particularly the diene rubbers which in most instances are susceptible of vulcanization with sulfur and possess the property of elasticity characterized by the ability to return to substantially their original dimensions after being stretched at least 200%.

While certain representative embodiments and details have been shown for the purpose of illustrating the invention, it will be apparent to those skilled in this art that various changes and modifications may be made therein without departing from the spirit or scope of the invention.

This application is a continuation in part application of my application Serial No. 363,717, filed June 24, 1953, for Reinforced Latex Foam Rubber Sponge.

What is claimed is:

A method of continuously shaping ungelled, foamed rubber latex, which comprises partially stiffening a rubber latex by adding a primary stiffening agent selected from at least one of the group consisting of soybean protein, casein and gelatin to said latex in an amount sufficient to cause partial stiffening of the latex, foaming said partially stiffened latex, adding a second stiffening agent selected from at least one of the group consisting of sodium polyacrylate and ammonium polyacrylate to said partially stiffened foam in an amount sufficient to further stiffen said foam whereby the foamed latex retains the shape imparted to it when unconfined, shaping the foamed latex by continuously passing it into and out of contact with a curved shaping means to thereby impart an orderly arranged configuration having a cross section of variable thickness and uniform density, and then continuously gelling and vulcanizing the shaped foamed latex.

References Cited in the file of this patent

UNITED STATES PATENTS

| | | |
|---|---|---|
| 2,066,596 | West | Jan. 5, 1937 |
| 2,161,308 | Murphy et al. | June 6, 1939 |
| 2,261,439 | Kelly | Nov. 4, 1941 |
| 2,290,736 | Buffington et al. | July 21, 1942 |
| 2,308,951 | Novotny et al. | Jan. 19, 1943 |
| 2,549,864 | Toulmin | Apr. 24, 1951 |
| 2,822,573 | Wasniewski et al. | Feb. 11, 1958 |

FOREIGN PATENTS

| | | |
|---|---|---|
| 1,082,852 | France | June 23, 1954 |

OTHER REFERENCES

Noble: "Latex in Industry," 2 Ed., 1953, published by Rubber Age, 250 W. 57th St., N.Y. 19, N.Y. Pages 233–234, 442, 443.